Patented Sept. 16, 1947

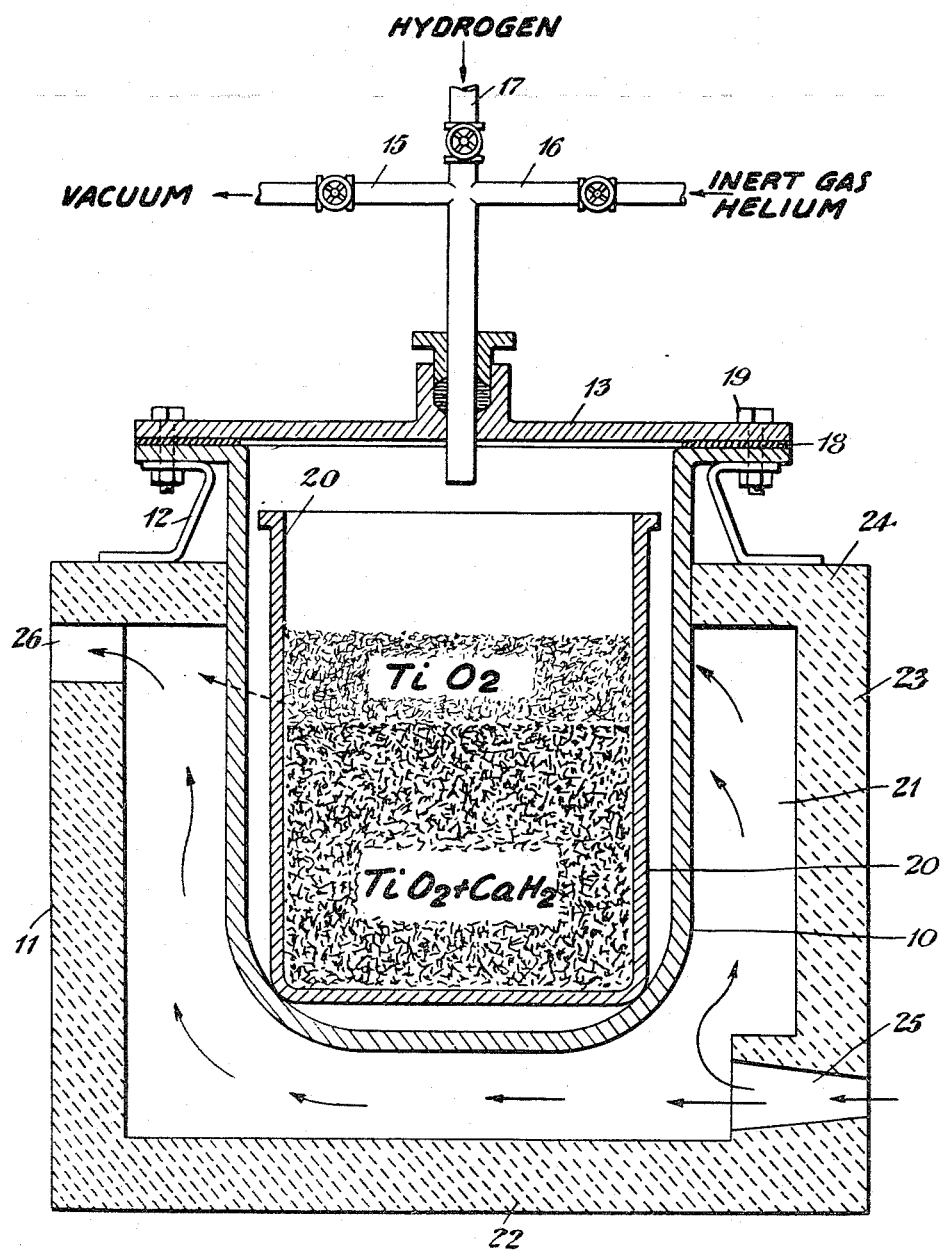

2,427,338

UNITED STATES PATENT OFFICE 2,427,338

PRODUCTION OF TITANIUM HYDRIDE

Peter P. Alexander, Beverly, Mass., assignor to Metal Hydrides Incorporated, Beverly, Mass., a corporation of Massachusetts Application March 26, 1945, Serial No. 584,855

15 Claims. (Cl. 23—204)

This invention relates to the production of titanium hydride and has for its object certain improvements in the method of producing titanium hydride.

While it is known that titanium hydride may be produced by reacting metallic titanium with hydrogen gas at an elevated temperature, the resulting product is generally impure because the metallic titanium employed as a starting material is generally impure. On account of its high melting point, 1800° C., its great tendency to combine with oxygen, nitrogen and carbon at high temperatures and the readiness with which it forms alloys with the common metals, the production of metallic titanium in a state of purity is very difficult. Various proposals have been advanced to produce titanium pyrometallurgically. For example, fluotitanates have been reduced by alkali metals; titanium dioxide by carbon; and titanium tetrachloride by sodium or magnesium. The first two methods give rather impure products, the first being contaminated with oxides and the second with carbide. The third method gives a purer product and has been conducted in various ways. An early procedure is to place titanium tetrachloride and sodium in a small bomb capable of withholding a total internal pressure of 80,000 lbs. and then to heat the bomb to low redness. The resulting reaction takes place with explosive violence. The residue obtained after cooling and washing consists for the most part of melted titanium but there are also present some coarse and semi-molten powder and a little fine powder. The yield is about 90% of that theoretically obtainable, the loss being attributable to oxidation. A later procedure is to react titanium tetrachloride with magnesium in a molybdenum-lined crucible in the presence of an inert gas at an elevated temperature. The reaction results in an impure powdered titanium, which is separated from the resulting magnesium chloride. These methods of producing metallic titanium obviously leave a great deal to be desired.

As a result of my investigations, I have discovered that titanium hydride may be produced readily and efficiently by an improved pyrometallurgical method. When operating in the special manner herein disclosed, a reducing agent may be employed which reacts with the titanium compound to effect a substantially complete reduction, leaving a metallic titanium product of high purity which may be converted promptly into titanium hydride of high purity.

In accordance with the invention, a charge of titanium compound and excess alkaline earth metal hydride is gradually heated in a reduction zone to a temperature sufficiently high to dissociate the alkaline earth metal hydride into alkaline earth metal and hydrogen gas and to reduce the titanium compound with the alkaline earth metal thus released to form metallic titanium and a compound of the alkaline earth metal. The reaction zone is evacuated while at a temperature sufficiently high to dissociate the excess alkaline earth metal hydride to remove hydrogen gas therefrom and to distill and pass the excess alkaline earth metal thus released from the charge into a body of absorbing material. Hydrogen gas is then admitted to the heated reaction zone in amount sufficient to convert the reduced titanium to titanium hydride. The resulting charge containing the titanium hydride and compound of the alkaline earth metal is cooled, after which the titanium hydride is separately recovered by leaching the charge with a solvent for the compound of the alkaline earth metal.

Various titanium compounds, such as titanium dioxide, titanium chloride, titanium iodide, or other halogen compound of totanium, etc., may be thus treated to convert the available titanium into a form of high purity which may then be converted into titanium hydride of high purity. In a presently preferred practice of the invention, titanium dioxide pigment is employed as the source of titanium.

Among the reducing agents particularly adapted for the practice of the invention are the alkaline earth metal hydrides, such as the hydrides of calcium, strontium and barium, of which calcium hydride is the cheapest and therefore the most practical. The reducing metal of the compound should be readily volatilizable or distillable, because it is used in excess of the amount required theoretically to effect the desired reduction, and the excess which does not actually enter into the reaction is distilled out of the charge and passed into the body of absorbing material, thus removing it from and keeping it out of contact with the reduced titanium.

The reaction zone is preferably evacuated in the beginning to remove air and moisture, and then filled with an inert gas. The inert gas is advantageously a monatomic gas, such as argon or helium, or a mixture of such gases. A sufficient amount of the gas is fed into the reduction zone to raise its pressure to a point at which upward movement of the vapors of reducing metal is inhibited, the object being to keep the reducing metal in contact with the titanium compound long enough to effect the desired reaction, and to prevent the distilled excess reducing metal from rising or passing completely through the body of absorbing material. The effect of the pressure exerted by the gas is to retard upward movement of the distilled reducing metal until that movement is in fact wanted, in a later step.

The absorbing material is advantageously a suitable metal oxide, such as titanium dioxide, zirconium dioxide, chromium oxide, etc., with which the excess distilled reducing metal may react, at least in part. While the body of absorbing material may be removed from the charge of titanium dioxide and reducing metal, it is highly advantageous to place it as a layer on top of the charge. In a presently preferred practice of the invention, a layer of titanium dioxide pigment, similar to the titanium dioxide pigment in the charge, of suitable thickness, is placed on top of the charge.

The charge of titanium dioxide pigment and excess alkaline earth metal hydride, with the layer of absorbing material, is heated in a reduction zone that has been advantageously evacuated to remove objectionable air and moisture, the air being replaced with a suitable inert gas, such as helium or argon, preferably under substantial positive pressure, as pointed out above. I have found that a pressure of 15 pounds is effective under the conditions at present employed in the practice of the invention.

As the charge gradually rises in temperature, the alkaline earth metal hydride gradually dissociates into hydrogen gas and alkaline earth metal. The alkaline earth metal thus released promptly reacts with the titanium dioxide pigment to form metallic titanium and an oxide of the alkaline earth metal. This reaction gradually progresses until the reduction goes to completion. The hydrogen gas released by dissociation of the alkaline earth metal hydride contacts the reduced titanium particles and keeps their surfaces clean, for example, from surface oxide. The excess alkaline earth metal hydride tends to remain as such at this stage of the operation. The reaction zone is then evacuated, while at a temperature sufficiently high to dissociate the excess alkaline earth metal hydride to remove hydrogen gas, as well as other gaseous reaction products, such as steam, and to distill and pass the excess alkaline earth metal thus released from the charge into the layer of absorbing material. If, for example, the absorbing material is also titanium dioxide, some of it may be reduced by the distilled excess reducing metal. Depending upon the temperature of the layer of absorbing material, some of the distilled excess reducing metal may be condensed therein and some of it, of course, may react with the titanium dioxide. In any event, it is desired so to conduct the heating operation that the distilled excess reducing metal is retained in the absorbing material to prevent its condensation and collection in areas removed from the absorbing material. Hydrogen gas is then admitted to the heated reaction zone in amount sufficient to convert the reduced titanium into titanium hydride; the charge being cooled if necessary to the hydriding temperature of the reduced titanium. The resulting charge containing the hydrided titanium particles and oxide of the alkaline earth metal is cooled. The charge is then leached with a solvent for the alkaline earth metal oxide to recover the titanium hydride.

A charge of finely divided and intimately admixed titanium dioxide pigment and excess calcium hydride, for example, is placed in a reaction zone and a layer of titanium dioxide pigment is placed on top of the charge. The reduction zone is evacuated, preferably at an elevated temperature, to remove air and moisture; after which the reaction zone is filled with helium or argon, preferably under positive pressure. The charge is gradually heated until the calcium hydride dissociates into calcium and hydrogen gas, and the reducing reaction sets in. The reactions may be indicated as follows:

(1) $TiO_2 + 2CaH_2 \rightarrow TiO_2 + Ca + H_2$ 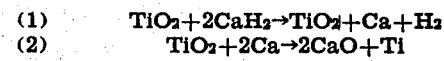
(2) $TiO_2 + 2Ca \rightarrow 2CaO + Ti$ And the combined dissociation and reducing reactions may be indicated conveniently as follows:

(3) $TiO_2 + 2CaH_2 \rightarrow 2CaO + Ti + 2H_2$ 

As a result, the calcium hydride is initially dissociated into calcium, the desired reducing metal, and hydrogen gas; the calcium reduces the titanium dioxide to titanium and forms calcium oxide; and the hydrogen gas released by dissociation of the calcium hydride reacts with surface oxide on the reduced titanium particles to form moisture which is promptly converted into steam.

The reaction zone is then evacuated, while at a temperature sufficiently high to dissociate the excess calcium hydride, to remove hydrogen gas as well as to distill and pass the excess calcium from the charge into the absorbing layer of titanium dioxide in which some or all of it reduces some of the titanium dioxide and in which some of it may be condensed. The layer of titanium dioxide should be sufficiently thick to catch and retain substantially all of the excess calcium as it rises from the underlying charge.

Hydrogen gas is then passed into the heated reaction zone in amount sufficient to convert the reduced titanium in the charge to titanium hydride, the reaction for which may be indicated as follows:

(4) $Ti + CaO + 2H_2 \rightarrow TiH_4 + CaO$ 

Since the reducing reaction, Equation 2 above, in which the freshly released calcium reacts with the titanium dioxide to form calcium oxide and titanium, takes place at a temperature higher than that at which the hydriding reaction of Equation 4 can take place, the charge is cooled, if necessary, to the hydriding temperature.

Various procedures may then be employed to recover the titanium hydride in the main part of the charge. Thus, the resultant charge and top layer are permitted to cool, after which they are removed from the reaction zone.

There is a clear line of demarcation between the resultant charge and top layer. The charge tends to be a sintered mass of calcium oxide and titanium hydride particles, whereas the absorbing layer of titanium dioxide containing the excess distilled calcium tends to remain in a fluffy condition and may be readily shaken off or brushed away.

The resultant charge containing the calcium oxide and titanium hydride may be treated in any suitable manner to separate the two. The calcium oxide may be removed by leaching the charge, preferably in crushed form, with a suitable solvent, for example dilute acid, such as hydrochloric, sulfuric, or acetic, or a solution of ammonium salt, in which it is soluble, but in which the titanium hydride is substantially insoluble.

These and other features of the invention will be better understood by referring to the accompanying drawing, taken in conjunction with the following description, which diagrammatically illustrates an apparatus adapted for a practice of the invention.

The apparatus shown comprises an outer retort 10 supported within a heating furnace 11, the retort being held in position by means of a plurality of supports 12 spaced under and around a circumferential flange of the retort and resting on the top of the heating furnace. The retort is made preferably of heat-resistant steel. It is provided with a removable cover 13 having attached thereto a vertical pipe 14 with lateral valved branches 15 and 16 and vertical valved branch 17 connectible with a source of vacuum, inert gas, such as helium or argon, and hydrogen gas, respectively. A gasket 18 is disposed between the cover and the flanged top portion of the outer retort, the three elements forming a non-leakable connection by means of a plurality of spaced bolts 19. A removable inner retort 20 having an open top rests within the outer retort.

The heating furnace consists essentially of a box-like chamber 21 having a refractory bottom 22, side and end walls 23 and a top 24 with an opening of a size adapted to receive the outer retort. An expanding opening 25 is provided at or near a lower corner of one of the side walls of the chamber, for the introduction of heating gases into the chamber. A flue opening 26 extends through another wall, preferably at a higher level, so that heating gases passed into the chamber through opening 25 tend to pass around and in contact with the outer retort before leaving the chamber through the flue opening.

The apparatus may be used as follows: A charge of finely divided and intimately admixed titanium dioxide pigment and excess calcium hydride, for example, is placed in the bottom of inner retort 20. An absorbing layer of titanium dioxide pigment is placed on the top of the charge, the layer being of suitable thickness and spread uniformly across the entire top of the charge. The inner retort is then placed in outer retort 10, gasket 18 is placed in position on the flanged portion of the top of the outer retort, and removable cover 13 is securely bolted thereon to make a non-leaking joint.

With the valves in lateral branch 16 and vertical branch 17 closed, the valve in lateral branch 15 is opened and the retorts are placed under vacuum to remove objectionable air and moisture. Heating gases are passed through opening 25 into furnace chamber 21. The retorts are kept under vacuum preferably as the charge rises in temperature to facilitate removal of the air and moisture. Before the charge reaches a temperature at which the calcium hydride dissociates and reduction of the titanium dioxide in the charge takes place, the valve in lateral branch 15 is closed and that in lateral branch 16 is opened to fill the retorts with inert gas, for example helium, preferably under pressure, for example 15 pounds. The introduction of heating gases into chamber 21 is continued to raise the temperature of the charge to the point at which dissociation of the calcium hydride and reduction of the titanium dioxide in the charge take place. When the reduction has gone to completion, with the valve in lateral branch 16 closed, the valve in lateral branch 15 is opened to evacuate the retorts. The temperature is sufficiently high to dissociate the excess calcium hydride in the charge as evacuation takes place. As a result, hydrogen previously released and hydrogen released at this stage, the inert gas and gaseous products of reaction are removed from the retorts. The excess calcium released is distilled and passed from the charge into the absorbing layer of titanium dioxide, where it reacts at least in part with some of the titanium dioxide. If the temperature of the layer is sufficiently low, some of the calcium may be condensed therein. In any event, the layer of titanium dioxide should be sufficiently deep to retain substantially all of the distilled excess calcium, either as such or as calcium oxide, so that calcium does not condense on the upper part of the inner or outer retort, on the cover or in the vertical pipe and lateral branches.

The valve in lateral branch 15 is closed; the valve in lateral branch 16 is preferably opened to admit inert gas to the reaction zone, under substantial positive pressure; and the valve in vertical branch 17 is opened to admit enough hydrogen gas to convert the reduced titanium in the charge to titanium hydride. As indicated above, the temperature of the charge may be dropped to that at which the desired hydriding reaction can take place.

The retorts and hence the resulting charge and absorbing layer are permitted to cool. Cover 13 is removed; inner retort 20 is withdrawn from outer retort 10 and its contents are removed therefrom. A clear line of demarcation tends to exist between the resulting absorbing layer and the underlying charge. The absorbing layer of titanium dioxide containing the distilled excess calcium remains essentially in a fluffy condition. The underlying charge containing the titanium hydride and calcium oxide is a more or less sintered coherent mass. It is therefore a simple matter to separate the two. The fluffy top layer may be brushed off the underlying charge.

Since the top layer consists of titanium dioxide, the reduction of some of it by the distilled excess calcium does not contaminate the initial reduced titanium or the final titanium hydride in the underlying charge. Under normal operating conditions, the temperature of the top or absorbing layer is sufficiently high to cause all or most of the distilled excess calcium to react with the titanium dioxide to form calcium oxide and reduce some of the titanium dioxide. If any of the distilled excess calcium should condense as such in the top or absorbing layer, it would react with the hydrogen gas admitted to hydride the reduced titanium, to form calcium hydride; which would, of course, be admixed with the calcium oxide and titanium dioxide in the top or absorbing layer. In any event, it does not contaminate the reduced titanium then initially present in the underlying charge or the titanium hydride finally present in the underlying charge. In other words, titanium hydride of high purity may be formed conveniently in the practice of the invention. The titanium hydride in the underlying charge is separately recovered in any suitable manner. For example, the charge is preferably crushed, after which the calcium oxide may be eliminated by leaching the charge with a suitable solvent, such as a dilute acid, for example hydrochloric, sulfuric, or acetic acid, or a solution of ammonium salt. The free titanium hydride may then be suitably treated to place it in marketable form, such as bars or powder.

While in the example described, calcium hydride is the reducing metal compound employed, other reducing agents can be employed, such as the hydrides of other alkaline earth metals. The oxide of any of the alkaline earth metals, formed as a result of the reducing reaction, may be similarly eliminated from the resulting underlying charge by leaching.

It will be clear to those skilled in this art that the method of the invention lends itself to a number of useful modifications and that the above-described practice is only by way of illustration.

I claim:

1. In the production of titanium hydride, the improvement which comprises gradually heating a charge of titanium compound and alkaline earth metal hydride in a reaction zone to a temperature sufficiently high to dissociate the alkaline earth metal hydride into alkaline earth metal and hydrogen gas and to reduce the titanium compound with the alkaline earth metal thus reelased to form metallic titanium and a compound of the alkaline earth metal, the alkaline earth metal hydride being present in amount sufficient to yield on dissociation the reducing alkaline earth metal in excess of the amount required to effect reduction of the titanium compound, evacuating the reaction zone while at a temperature sufficiently high to dissociate the excess alkaline earth metal hydride to remove hydrogen gas and gaseous products of reaction therefrom and to distill and pass the excess alkaline earth metal thus released from the charge into a body of absorbing material, introducing hydrogen gas into the heated reaction zone in amount sufficient to convert the reduced titanium to titanium hydride, cooling the resulting charge containing the titanium hydride and compound of the alkaline earth metal, and separately recovering the titanium hydride by leaching the charge with a solvent for the compound of the alkaline earth metal.

2. In the production of titanium hydride, the improvement which comprises gradually heating a charge of titanium compound and alkaline earth metal hydride in a reaction zone containing an inert gas in amount to place the reaction zone under substantial positive pressure to a temperature sufficiently high to dissociate the alkaline earth metal hydride into alkaline earth metal and hydrogen gas and to reduce the titanium compound with the alkaline earth metal thus released to form metallic titanium and a compound of the alkaline earth metal, the alkaline earth metal hydride being present in amount sufficient to yield on dissociation the reducing alkaline earth metal in excess of the amount required to effect reduction of the titanium dioxide, evacuating the reaction zone while at a temperature sufficiently high to dissociate the excess alkaline earth metal hydride to remove hydrogen gas, the inert gas and gaseous products of reaction therefrom and to distill and pass the excess alkaline earth metal thus released from the charge into a body of obsorbing material, introducing hydrogen gas into the heated reaction zone in amount sufficient to convert the reduced titanium to titanium hydride, cooling the resulting charge containing the titanium hydride and compound of the alkaline earth metal, and separately recovering the titanium hydride by leaching the charge with a solvent for the compound of the alkaline earth metal.

3. In the production of titanium hydride, the improvement which comprises gradually heating a charge of titanium dioxide pigment and alkaline earth metal hydride in a reaction zone to a temperature sufficiently high to dissociate the alkaline earth metal hydride into alkaline earth metal and hydrogen gas and to reduce the titanium dioxide pigment with the alkaline earth metal thus released to form metallic titanium and an oxide of the alkaline earth metal, the alkaline earth metal hydride being present in amount sufficient to yield on dissociation the reducing alkaline earth metal in excess of the amount required to effect reduction of the titanium dioxide, evacuating the reaction zone while at a temperature sufficiently high to dissociate the excess alkaline earth metal hydride to remove hydrogen gas and gaseous products of reaction therefrom and to distill and pass the excess alkaline earth metal thus released from the charge into an absorbing body of titanium dioxide pigment, introducing hydrogen gas into the heated reaction zone in amount sufficient to convert the reduced titanium to titanium hydride, cooling the resulting charge containing the titanium hydride and the oxide of the alkaline earth metal, and separately recovering the titanium hydride by leaching the charge with a solvent for the oxide of the alkaline earth metal.

4. In the production of titanium hydride, the improvement which comprises gradually heating a charge of titanium dioxide pigment and alkaline earth metal hydride in a reaction zone to a temperature sufficiently high to dissociate the alkaline earth metal hydride into alkaline earth metal and hydrogen gas and to reduce the titanium dioxide pigment with the alkaline earth metal thus released to form metallic titanium and an oxide of the alkaline earth metal, the alkaline earth metal hydride being present in amount sufficient to yield on dissociation the reducing alkaline earth metal in excess of the amount required to effect reduction of the titanium dioxide, evacuating the reaction zone while at a temperature sufficiently high to dissociate the excess alkaline earth metal hydride to remove hydrogen gas and gaseous products of reaction therefrom and to distill and pass the excess alkaline earth metal thus released from the charge into an absorbing body of zirconium dioxide pigment, introducing hydrogen gas into the heated reaction zone in amount sufficient to convert the reduced titanium to titanium hydride, cooling the resulting charge containing the titanium hydride and the oxide of the alkaline earth metal, and separately recovering the titanium hydride by leaching the charge with a solvent for the oxide of the alkaline earth metal.

5. In the production of titanium hydride, the improvement which comprises gradually heating a charge of titanium dioxide pigment and alkaline earth metal hydride in a reaction zone to a temperature sufficiently high to dissociate the alkaline earth metal hydride into alkaline earth metal and hydrogen gas and to reduce the titanium dioxide pigment with the alkaline earth metal thus released to form metallic titanium and an oxide of the alkaline earth metal, the alkaline earth metal hydride being present in amount sufficient to yield on dissociation the reducing alkaline earth metal in excess of the amount required to effect reduction of the titanium dioxide, evacuating the reaction zone while at a temperature sufficiently high to dissociate the excess alkaline earth metal hydride to remove hydrogen gas and gaseous products of reaction therefrom and to distill and pass the excess alkaline earth metal thus released from the charge into an absorbing body of chromium oxide pigment, introducing hydrogen gas into the heated reaction zone in amount sufficient to convert the reduced titanium to titanium hydride, cooling the resulting charge containing the titanium hydride and the oxide of the alkaline earth metal, and separately recovering the titanium hydride by leaching the charge with a solvent for the oxide of the alkaline earth metal.

6. In the production of titanium hydride, the improvement which comprises placing a charge of titanium dioxide pigment and alkaline earth metal hydride in a reaction zone, placing a layer of absorbing material on top of the charge, gradually heating the charge to a temperature sufficiently high to dissociate the alkaline earth metal hydride into alkaline earth metal and hydrogen gas to reduce the titanium dioxide with the alkaline earth metal thus released to form metallic titanium and an oxide of the alkaline earth metal, the alkaline earth metal hydride being present in amount sufficient to yield on dissociation the reducing alkaline earth metal in excess of the amount required to effect reduction of the titanium dioxide, evacuating the reaction zone while at a temperature sufficiently high to dissociate the excess alkaline earth metal hydride to remove hydrogen gas and gaseous products of reaction therefrom and to distill and pass the excess alkaline earth metal thus released from the underlying charge into the overlying layer of absorbing material, introducing hydrogen gas into the heated reaction zone in amount sufficient to convert the reduced titanium to titanium hydride, cooling the resulting charge containing the titanium hydride and the oxide of the alkaline earth metal, separating the overlying layer of absorbing material from the underlying charge, and separately recovering the titanium hydride by leaching the charge with a solvent for the oxide of the alkaline earth metal.

7. In the production of titanium hydride, the improvement which comprises placing a charge of titanium dioxide pigment and alkaline earth metal hydride in a reaction zone, placing a layer of absorbing material on top of the charge, gradually heating the charge in the presence of an inert gas maintained under substantial positive pressure to a temperature sufficiently high to dissociate the alkaline earth metal hydride into alkaline earth metal and hydrogen gas to reduce the titanium dioxide with the alkaline earth metal thus released to form metallic titanium and an oxide of the alkaline earth metal, the alkaline earth metal hydride being present in amount sufficient to yield on dissociation the reducing alkaline earth metal in excess of the amount required to effect reduction of the titanium dioxide, evacuating the reaction zone while at a temperature sufficiently high to dissociate the excess alkaline earth metal hydride to remove hydrogen gas, the inert gas and gaseous products of reaction therefrom and to distill and pass the excess alkaline earth metal thus released from the underlying charge into the overlying layer of absorbing material, introducing hydrogen gas into the heated reaction zone in amount sufficient to convert the reduced titanium to titanium hydride, cooling the resulting charge containing the titanium hydride and the oxide of the alkaline earth metal, separating the overlying layer of absorbing material from the underlying charge, and separately recovering the titanium hydride by leaching the charge with a solvent for the oxide of the alkaline earth metal.

8. In the production of titanium hydride, the improvement which comprises placing a charge of titanium dioxide pigment and alkaline earth metal hydride in a reaction zone, placing an absorbing layer of titanium dioxide pigment on top of the charge, gradually heating the charge to a temperature sufficiently high gradually to dissociate the alkaline earth metal hydride into alkaline earth metal and hydrogen gas to reduce the titanium dioxide in the charge with the alkaline earth metal thus released to form metallic titanium and an oxide of the alkaline earth metal, the alkaline earth metal hydride being present in amount sufficient to yield on dissociation the reducing alkaline earth metal in excess of the amount required to effect reduction of the titanium dioxide, evacuating the reaction zone while at a temperature sufficiently high to dissociate the excess alkaline earth metal hydride to remove hydrogen gas and gaseous products of reaction therefrom and to distill and pass the excess alkaline earth metal thus released from the underlying charge into the overlying layer of titanium dioxide pigment, introducing hydrogen gas into the heated reaction zone in amount sufficient to convert the reduced titanium to titanium hydride, cooling the resulting charge containing the titanium hydride and the oxide of the alkaline earth metal, separating the overlying layer of absorbing material from the underlying charge, and separately recovering the titanium hydride by leaching the charge with a solvent for the oxide of the alkaline earth metal.

9. In the production of titanium hydride, the improvement which comprises placing a charge of titanium dioxide pigment and calcium hydride in a reaction zone, placing a layer of absorbing material on top of the charge, gradually heating the charge to a temperature sufficiently high gradually to dissociate the calcium hydride into calcium and hydrogen gas to reduce the titanium dioxide in the charge with the calcium thus released to form metallic titanium and calcium oxide, the calcium hydride being present in amount sufficient to yield on dissociation reducing calcium metal in excess of the amount required to effect reduction of the titanium dioxide, evacuating the reaction zone while at a temperature sufficiently high to dissociate the excess calcium hydride to remove hydrogen gas and gaseous products of reaction therefrom and to distill and pass the excess calcium thus released from the underlying charge into the overlying layer of absorbing material, introducing hydrogen gas into the heated reaction zone in amount sufficient to convert the reduced titanium to titanium hydride, cooling the resulting charge containing the titanium hydride and the calcium oxide, separating the overlying layer of absorbing material from the underlying charge, and separately recovering the titanium hydride by leaching the charge with a solvent for the calcium oxide.

10. In the production of titanium hydride, the improvement which comprises placing a charge of titanium dioxide pigment and calcium hydride in a reaction zone, placing an absorbing layer of metal oxide on top of the charge, gradually heating the charge to a temperature sufficiently high gradually to dissociate the calcium hydride into calcium and hydrogen gas to reduce the titanium dioxide in the charge with the calcium thus released to form metallic titanium and calcium oxide, the calcium hydride being present in amount sufficient to yield on dissociation reducing calcium metal in excess of the amount required to effect reduction of the titanium dioxide, evacuating the reaction zone while at a temperature sufficiently high to dissociate the excess calcium hydride to remove hydrogen gas and gaseous products of reaction therefrom and to distill and pass the excess calcium thus released from the underlying charge into the overlying layer of metal oxide, introducing hydrogen gas into the heated reaction zone in amount sufficient to convert the reduced titanium to titanium hydride, cooling the resulting charge containing the titanium hydride and the calcium oxide, separating the overlying layer of absorbing material from the underlying charge, and separately recovering the titanium hydride by leaching the charge with a solvent for the calcium oxide.

11. In the production of titanium hydride, the improvement which comprises placing a charge of titanium dioxide pigment and calcium hydride in a reaction zone, placing an absorbing layer of titanium dioxide pigment on top of the charge, gradually heating the charge to a temperature sufficiently high gradually to dissociate the alkaline earth metal hydride into calcium and hydrogen gas to reduce the titanium dioxide in the charge with the calcium thus released to form metallic titanium and calcium oxide, the calcium hydride being present in amount sufficient to yield on dissociation reducing calcium metal in excess of the amount required to effect reduction of the titanium dioxide, evacuating the reaction zone while at a temperature sufficiently high to dissociate the excess calcium hydride to remove hydrogen gas and gaseous products of reaction therefrom and to distill and pass the excess calcium thus released from the underlying charge into the overlying layer of titanium dioxide pigment, introducing hydrogen gas into the heated reaction zone in amount sufficient to convert the reduced titanium to titanium hydride, cooling the resulting charge containing the titanium hydride and the calcium oxide, separating the overlying layer of absorbing material from the underlying charge, and separately recovering the titanium hydride by leaching the charge with a solvent for the calcium oxide.

12. In the production of titanium hydride, the improvement which comprises placing a charge of titanium dioxide pigment and calcium hydride in a reaction zone, placing an absorbing layer of titanium dioxide pigment on top of the charge, evacuating the reduction zone to remove air and moisture, gradually heating the charge to a temperature sufficiently high gradually to dissociate the alkaline earth metal hydride into calcium and hydrogen gas to reduce the titanium dioxide in the charge with the calcium thus released to form metallic titanium and calcium oxide, the calcium hydride being present in amount sufficient to yield on dissociation reducing calcium metal in excess of the amount required to effect reduction of the titanium dioxide, evacuating the reaction zone while at a temperature sufficiently high to dissociate the excess calcium hydride to remove hydrogen gas and gaseous products of reaction therefrom and to distill and pass the excess calcium thus released from the underlying charge into the overlying layer of titanium dioxide pigment, introducing hydrogen gas into the heated reaction zone in amount sufficient to convert the reduced titanium to titanium hydride, cooling the resulting charge containing the titanium hydride and the calcium oxide, separating the overlying layer of absorbing material from the underlying charge, and separately recovering the titanium hydride by leaching the charge with a solvent for the calcium oxide.

13. In the production of titanium hydride, the improvement which comprises placing a charge of titanium dioxide pigment and calcium hydride in a reaction zone, placing an absorbing layer of titanium dioxide pigment on top of the charge, evacuating the reaction zone to remove air and moisture, filling the reaction zone with an inert gas, maintaining the reaction zone under substantial positive pressure with said inert gas, gradually heating the charge to a temperature sufficiently high gradually to dissociate the alkaline earth metal hydride into calcium and hydrogen gas to reduce the titanium dioxide in the charge with the calcium thus released to form metallic titanium and calcium oxide, the calcium hydride being present in amount sufficient to yield on dissociation reducing calcium metal in excess of the amount required to effect reduction of the titanium dioxide, evacuating the reaction zone while at a temperature sufficiently high to dissociate the excess calcium hydride to remove hydrogen gas, the inert gas and gaseous products of reaction therefrom and to distill and pass the excess calcium thus released from the underlying charge into the overlying layer of titanium dioxide pigment, introducing hydrogen gas into the heated reaction zone in amount sufficient to convert the reduced titanium to titanium hydride, cooling the resulting charge containing the titanium hydride and the calcium oxide, separating the overlying layer of absorbing material from the underlying charge, and separately recovering the titanium hydride by leaching the charge with a solvent for the calcium oxide.

14. In a method wherein a charge comprising a titanium compound and an alkaline earth metal hydride is heated to a temperature sufficiently high to dissociate the alkaline earth metal hydride into alkaline earth metal and hydrogen gas and to reduce the titanium compound with the alkaline earth metal thus released to form metallic titanium and a compound of the alkaline earth metal, the alkaline earth metal hydride being present in amount sufficient to yield on dissociation the reducing alkaline earth metal in excess of the amount required to effect reduction of said titanium compound, the improvement which comprises externally heating the charge together with a separate overlying layer of an absorbing material sufficiently high to reduce said titanium compound and to distill and pass the excess alkaline earth metal from the charge into the separate layer of absorbing material, said absorbing material being a metal oxide with which the excess distilled alkaline earth metal is capable of reacting.

15. In a method wherein a charge comprising a titanium compound and an alkaline earth metal is heated to a temperature sufficiently high to reduce the titanium compound and form a compound of the alkaline earth metal, the alkaline earth metal being present in amount in excess of that required to effect reduction of said titanium compound, the improvement which comprises externally heating the charge together with a separate overlying layer of an absorbing material sufficiently high to reduce said titanium compound and to distill and pass the excess alkaline earth metal from the charge into the separate layer of absorbing material, said absorbing material being a metal oxide with which the alkaline earth metal is capable of reacting.

PETER P. ALEXANDER.

Certificate of Correction

Patent No. 2,427,338.  September 16, 1947.

PETER P. ALEXANDER

It is hereby certified that errors appear in the printed specification of the above numbered patent requiring correction as follows: Column 2, line 25, for "totanium" read *titanium*; column 7, line 21, claim 1, for "reelased" read *released*; line 57, claim 2, for "dioxide" read *compound*; and that the said Letters Patent should be read with these corrections therein that the same may conform to the record of the case in the Patent Office.

Signed and sealed this 6th day of January, A. D. 1948.

[SEAL]

THOMAS F. MURPHY,
*Assistant Commissioner of Patents.*